US012590588B2

(12) United States Patent
Jaeger et al.

(10) Patent No.: US 12,590,588 B2
(45) Date of Patent: Mar. 31, 2026

(54) IMPELLER HAVING A TOOTHING IN THE COVER PLATE

(71) Applicant: KSB SE & Co. KGaA, Frankenthal (DE)

(72) Inventors: Christoph Jaeger, Gerolsheim (DE); Axel Schunk, Frankenthal (DE); Tobias Seckinger, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 0 days.

(21) Appl. No.: 18/700,965

(22) PCT Filed: Oct. 10, 2022

(86) PCT No.: PCT/EP2022/078069

§ 371 (c)(1),
(2) Date: Apr. 12, 2024

(87) PCT Pub. No.: WO2023/061920

PCT Pub. Date: Apr. 20, 2023

(65) Prior Publication Data

US 2024/0410384 A1 Dec. 12, 2024

(30) Foreign Application Priority Data

Oct. 13, 2021 (DE) .................... 10 2021 005 121.1

(51) Int. Cl.

| | |
|---|---|
| ***F04D 29/22*** | (2006.01) |
| ***F04D 1/00*** | (2006.01) |
| ***F04D 29/62*** | (2006.01) |

(52) U.S. Cl.

CPC .......... *F04D 29/2222* (2013.01); *F04D 1/00* (2013.01); *F04D 29/62* (2013.01); *F05D 2230/21* (2013.01); *F05D 2230/232* (2013.01)

(58) Field of Classification Search

CPC ........ F04D 29/2222; F04D 1/00; F04D 29/62; F05D 2230/21; F05D 2230/232

See application file for complete search history.

(56) References Cited

U.S. PATENT DOCUMENTS 5,538,395 A * 7/1996 Hager ............... B29C 66/73921 416/241 A
6,033,183 A * 3/2000 Genster .............. B29C 45/0062 416/186 A (Continued)

FOREIGN PATENT DOCUMENTS

CN 211852259 * 4/2020 ............ F04D 29/22
CN 210949253 U 7/2020

(Continued)

OTHER PUBLICATIONS

International Search Report (PCT/ISA/210) issued in PCT Application No. PCT/EP2022/078069 dated Jan. 30, 2023 with English translation (6 pages).

(Continued)

*Primary Examiner* — Andrew J Marien

(74) *Attorney, Agent, or Firm* — Crowell & Moring LLP

(57) ABSTRACT

A centrifugal pump includes an impeller. The impeller has a rear shroud, on which blades are arranged. The blades are at least partially in contact with a cover plate. Each blade has a projection that is configured to form a joint with the cover plate.

14 Claims, 4 Drawing Sheets

(56) References Cited

U.S. PATENT DOCUMENTS

| | | | | |
|---|---|---|---|---|
| 6,805,531 | B2 * | 10/2004 | Iida | F04D 29/281 416/185 |
| 8,793,872 | B2 * | 8/2014 | Adachi | B29C 66/301 264/405 |
| 2008/0279682 | A1 * | 11/2008 | Wydra | F04D 17/08 415/206 |
| 2013/0011268 | A1 * | 1/2013 | Miller | F01D 5/048 416/223 R |
| 2017/0370373 | A1 | 12/2017 | Rausch | |
| 2019/0390686 | A1 | 12/2019 | Will | |
| 2021/0381521 | A1 * | 12/2021 | Hidekura | F04D 29/2222 |

FOREIGN PATENT DOCUMENTS

| | | | |
|---|---|---|---|
| CN | 211852259 | U | 11/2020 |
| DE | 10 2014 226 525 | A1 | 6/2016 |
| DE | 10 2016 211 605 | A1 | 12/2017 |
| DE | 10 2016 225 018 | A1 | 6/2018 |
| EP | 0 241 659 | A1 | 10/1987 |
| EP | 3 263 318 | A1 | 1/2018 |
| EP | 3 608 546 | B1 | 5/2022 |

OTHER PUBLICATIONS

German-language Written Opinion (PCT/ISA/237) issued in PCT Application No. PCT/EP2022/078069 dated Jan. 30, 2023 with English translation (9 pages).

German-language Search Report issued in German Application No. 10 2021 005 121.1 dated Aug. 11, 2022 with partial English translation (13 pages).

* cited by examiner

IMPELLER HAVING A TOOTHING IN THE COVER PLATE

CROSS REFERENCE TO RELATED APPLICATION

This application claims priority under 35 U.S.C. § 119 from German Patent Application No. 102021005121.1, filed Oct. 13, 2021, the entire disclosure of which is herein expressly incorporated by reference.

BACKGROUND

The specification relates to a centrifugal pump comprising an impeller, which has a rear shroud, on which blades are arranged, which are at least partially in contact with a cover plate.

An impeller is a rotating bladed component of a turbomachine, e.g. a centrifugal pump. Here, mechanical power is converted into a pump power output by deflection of the flow at the blades.

To accommodate the blades, all impellers have a rear shroud and, in the case of closed impellers, also a front cover plate. Viewed in a different way, an impeller has an inner cover plate and, in the case of a closed impeller, also an outer cover plate.

A radial impeller of this kind for a centrifugal pump is described by way of example in DE 10 2016 225 018 A1. Blades are arranged between a rear shroud and a cover plate. The fluid flows in the axial direction to the impeller, is deflected by 90° and then emerges in the radial direction from the impeller.

In addition to impellers based on metal, impellers made of plastic are also known. Impellers made of plastic have impressive corrosion resistance and wear resistance when used in centrifugal pumps.

Plastic impellers are generally produced in two parts by injection molding. One part comprises a rear shroud with integrally molded blades, and the second part forms the cover plate of the impeller. In a second production step, the two parts are welded, generally by ultrasound.

In the case of ultrasonic welding, a generator converts mains voltage into a high-frequency alternating voltage, which is converted into mechanical vibration. The vibrations are introduced into the parts to be joined by means of a sonotrode, leading to heating and plastification of the material. On completion of the introduction of ultrasound, a short cooling phase under pressure ensures a uniform welded joint between the two joining partners.

DE 10 2014 226 525 A1 discloses a centrifugal pump impeller having a nonmetallic impeller part and a metallic hub part, which is connected to the impeller part and is arranged on a shaft. There is a detachable joint between the impeller part and the hub part.

It is not only the connection to the impeller shaft but also precisely the contact bond between the cover plate and the blades in the region of the suction inlet which is exposed to enormous loads. Here, an ultrasonically welded joint is subject to particularly high stresses. Disadvantageously, hydraulically optimized impellers are often of curved design, especially at the suction inlet, resulting in a disadvantageous angle for the formation of a stable joint for ultrasonic welding. Owing to weak joints in the region of the suction inlet, ultrasonically welded plastic impellers may become defective after only a short time in operation.

It is an object of the specification to specify a centrifugal pump having an impeller which ensures a reliable joint between the cover plate and the impeller blades, even when the shape is of hydraulically optimized design. Moreover, it should be possible to implement the plastic impeller simply, quickly and economically.

According to the specification, this and other objects are achieved by a centrifugal pump having an impeller and by a method for producing the impeller. Preferred variants can be found in the dependent claims, the description and the drawings.

According to the specification, each blade of an impeller has a projection for the formation of a joint with the cover plate.

In a particularly advantageous variant of the specification, each projection extends very largely over the entire length of a blade, thereby making it possible to form a particularly secure and stable joint with the cover plate.

In another variant of the specification, the blade merges smoothly into the shape of the projection in some region or regions and thus forms a unit which engages partially in the cover plate.

In an alternative variant of the specification, each blade of the impeller has a first portion, which extends downstream from a leading edge. This first portion is adjoined directly by a second portion. The projection is preferably formed in the first portion. In an alternative variant of the specification, the projection can also be arranged on the second portion.

In one variant of the specification, a third portion can furthermore directly adjoin the second portion. The third portion preferably extends as far as the trailing edge of the blade.

In a particularly advantageous variant of the specification, the projection extends over the entire first portion. In this case, the first portion itself extends on the back of the blade over more than 10%, preferably more than 19%, in particular more than 28%, of the blade length.

Ideally, the projection is arranged on the first portion in such a way that it occupies the entire blade width. In a preferred variant of the specification, the projection is of wedge-shaped design. In this case, it has a rounded portion toward the leading edge of the blade, said rounded portion adjoining a comb-shaped wedge. On the pressure side and the suction side of the blade, the wedge has steep flanks. The flanks are preferably designed with different gradients, thereby ensuring that engagement in the groove of the hydraulically optimally shaped cover plate is performed with reliable retention.

In one variant of the specification, the wedge-shaped projection widens from the leading edge in the direction of the second portion. In this case, the comb-shaped wedge has a small plateau behind the rounded portion in the direction of the second portion.

The cover plate advantageously has a respective groove, into which a wedge of a blade engages. This forms the basis for a stable and reliable joint between the cover plate and the blades, a joint which can permanently withstand loads, particularly in the suction region.

The groove preferably has a trapezoidal cross section. In this case, the flanks of the groove taper somewhat toward the top of the groove, as a result of which the groove is in part made somewhat narrower than the wedge. The groove has a length which corresponds at least to the wedge length. Moreover, the groove has a height of at least 10%, preferably of at least 20%, in particular of at least 30%, of the blade height.

In a particularly advantageous variant of the specification, the sharply tapering wedge is designed to be at least in part somewhat wider than the groove, thereby ensuring linear contact with the cover plate at both flanks of the wedge when the cover plate is placed on. This linear contact is converted by the ultrasonic welding method into a materially integral joint, thereby giving rise to a reliable, loadable and long-life joint precisely in the suction region of the impeller.

In one variant of the specification, the wedge-shaped projection is designed to be wider at its widest point than the groove but has a lower height. A cavity is thereby formed between the projection and the groove. The linear, materially integral joints are arranged on the steep pressure-side flank and on the steep suction-side flank of the wedge.

By virtue of the special wedge-shaped configuration of the projection, two linear contact locations are formed with the cover plate and, when energy is introduced by the sonotrode during ultrasonic welding, these are virtually at a right angle to the sonotrode, leading to the stable formation of the materially integral joint. Particularly in the case of known impellers of hydraulically optimized design, it has not been possible hitherto to ensure the favorable angle for the introduction of energy in this way.

By virtue of the advantageous shape of the projection in the form of a wedge, which forms two materially integral joints with the cover plate at the flanks, a particularly reliable joint between the blade and the cover plate is achieved. Owing to the doubling of the connection lines and the ensuring, by means of the design, of an advantageous angle of energy introduction during ultrasonic welding, a plastic impeller that is particularly capable of bearing loads is achieved.

An elevation is formed in the second portion of the blade, which directly adjoins the first portion. The elevation is preferably of prism-shaped design, and serves as an energy director for the ultrasonic welding, thereby ensuring that a linear, materially integral joint is produced between the blade and the cover plate. The connection to the blade in the second portion is generally subject to less stress, and the shape of the cover plate generally enables energy to be introduced at right angles during ultrasonic welding, thereby making it possible to achieve a reliable joint between the blade and the cover plate.

In an alternative variant of the specification, the energy director can also be arranged on the first portion in order to form a linear, materially integral joint between the blade and the cover plate. In one specific embodiment of the specification, the energy director can additionally be arranged on the projection.

For joining plastic parts by means of ultrasonic welding, the joining zones are usually provided with energy directors. Energy directors are preferably molded-on peripheral material webs of triangular cross section, preferably with a height of 0.4-0.6 mm.

By means of the energy director, targeted and concentrated introduction of energy is achieved during ultrasonic welding. The frictional heat leads to rapid melting of the prism-shaped elevation, leading to a reliable materially integral joint.

In one advantageous variant of the specification, the prism-shaped elevation extends completely over the second portion. This leads to a materially integral joint formed over the entire blade length, thereby ensuring that the cover plate is connected in a particularly reliable manner to the blades of the impeller.

In a particularly advantageous variant of the specification, the first portion has a projection but no energy director, the second portion has a projection with an energy director, and the third portion has neither a projection nor an energy director. By means of this variant, positive engagement is achieved in the first portion, where ultrasonic welding is difficult, in addition to welding at the linear contact locations. In the second portion, welding then additionally takes place via the energy director, thereby making the joint between the blade and the cover plate particularly stable in this region. In the third portion, there is no positive and materially integral joint between the blade and the cover plate in order to avoid unnecessarily weakening the cover plate by the introduction of grooves.

The second portion advantageously extends on the back of the blade, preferably over more than 50%, preferably more than 65%, in particular more than 80%, of the blade length.

In an advantageous variant of the specification, the third portion extends on the back of the blade over more than 6%, preferably more than 9%, in particular more than 12%, of the blade length as far as the trailing edge of the blade.

The cover plate and the rear shroud with the blades are preferably formed from a plastic, preferably a polysulfone or a polyphenylsulfide or a polyethersulfone.

Polysulfone is an amorphous plastic which is among the high-performance thermoplastics resistant to high temperatures. Polysulfone is transparent with a slight yellow cast and is hard, stiff and tough in a range of from −100 to 190° C. Moreover, polysulfone has high resistance to chemicals.

Polyphenylene sulfide (PPS) is a thermoplastic, partially crystalline high-performance plastic resistant to high temperatures. PPS has good mechanical properties and good chemical resistance to virtually all solvents and to many acids and alkalis.

According to the specification, the plastic impeller for a centrifugal pump is produced in a method comprising the following steps: First of all, the rear shroud with the blades and the cover plate with the grooves are formed separately in an injection molding method from a plastic, preferably a high-performance plastic, in particular a polysulfone or polyphenylene sulfide. The cover plate is placed on the rear shroud with the blades, with the result that the wedge-shaped projection of each blade engages in one groove of the cover plate. The engagement of the wedge-shaped projection in the groove gives rise to the formation of two linear, materially integral contact locations of the blade with the cover plate. When energy is supplied by means of ultrasound, the contact locations are melted and form materially integral linear joints.

During ultrasonic welding, the heat required for plastification is produced by the conversion of ultrasonic vibrations into mechanical vibrations and is fed into the parts to be welded with a certain contact pressure via the sonotrode. The part formed is held precisely in position and cools under subsequent pressure.

By means of the projection according to the specification, which engages in a groove and thus in each case forms two materially integral joints instead of one materially integral joint between the cover plate and the blades, the previously weak joint at the suction inlet receives significant reinforcement. A joint between the blades and the cover plate of a plastic impeller, which joint is reinforced structurally by two materially integral contact lines, can reliably withstand the loads during delivery. Moreover, the solution can be implemented economically, simply and quickly.

Further features and advantages of the specification will be found in the description of exemplary embodiments with reference to drawings and from the drawings themselves, in which:

DETAILED DESCRIPTION

Figure 1:
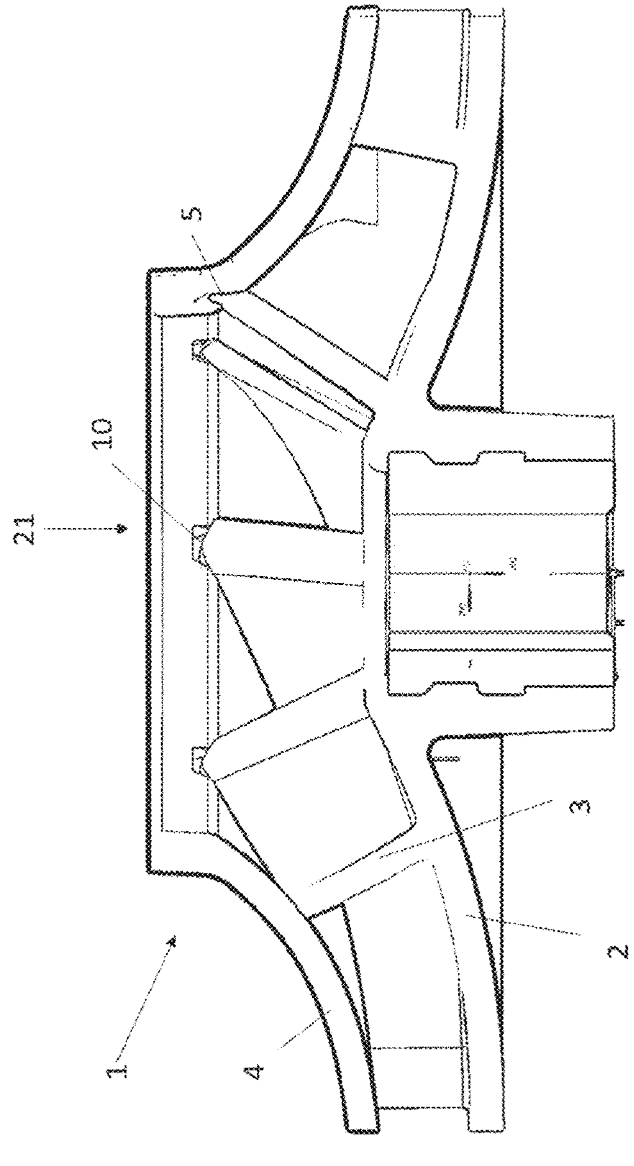
FIG. 1 shows a sectional illustration of the impeller.

FIG. 1 shows a sectional illustration of an impeller 1 for a centrifugal pump. In this variant embodiment, the impeller 1 is formed from polyphenylene sulfide. The blades 3 are fixedly molded to the rear shroud 2. The cover plate 4 rests on the blades 3 and has a groove 10 for each blade 3 in the region of the suction inlet 21, in each of which grooves a projection 5 engages.

Figure 2:
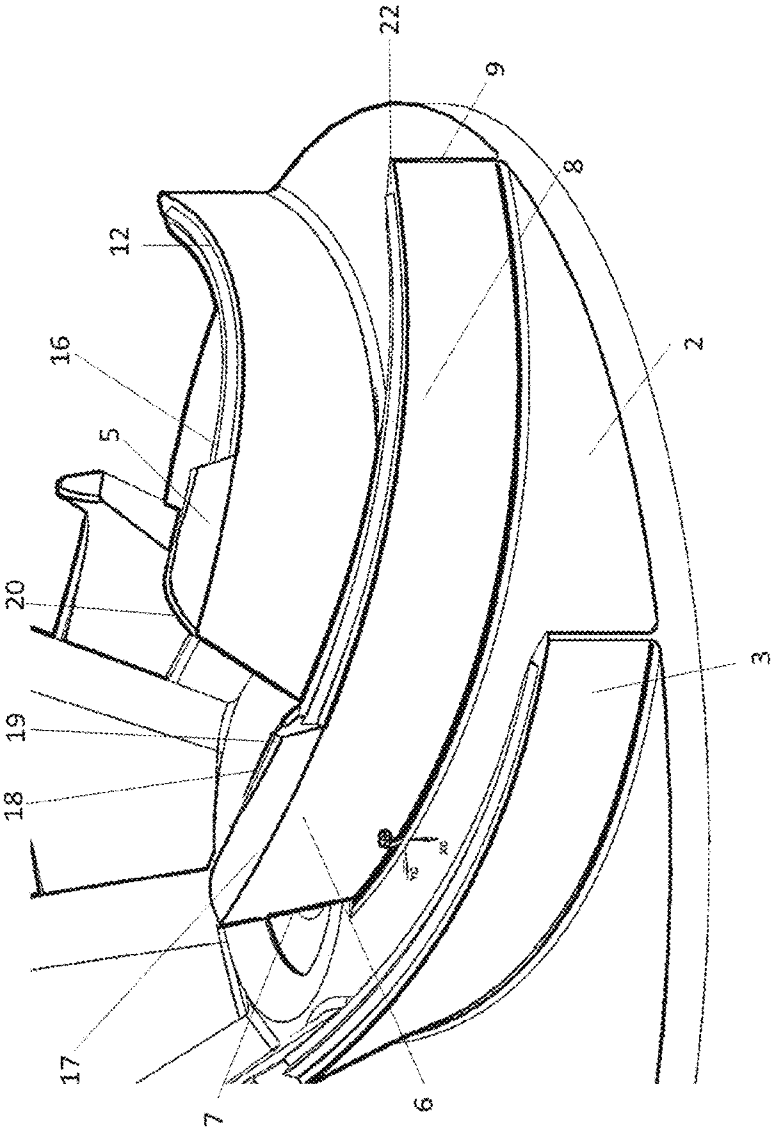
FIG. 2 shows a perspective illustration of the rear shroud with blades.

FIG. 2 shows a perspective illustration of the rear shroud 2 with the blades 3. A blade 3 extends with a radially outward curvature from the leading edge 7 for the fluid to the trailing edge 9, which ends flush with the rear shroud 2. In this case, the blade 3 has a first portion 6, a second portion 8 and a third portion 22 on its blade back 16. The first portion 6 extends from the leading edge 7 in the direction of the trailing edge 9 and faces into the fluid flow. The second portion 8 directly adjoins the first portion 6 and extends in the direction of the trailing edge 9. The third portion 22 adjoins the second portion 8 and extends as far as the trailing edge 9. In this exemplary embodiment, the first portion extends over 25%, the second portion over 70% and the third portion over 5% of the blade length.

The projection 5 is arranged in the first portion 6. In this exemplary embodiment, the projection 5 extends over the entire surface of the first portion 6 on the blade back 16. The projection 5 has a rounded portion 20 toward the leading edge 7 and is of wedge-shaped design. In the first portion 6, the wedge-shaped projection 5 has the width of the blade 3 and then narrows toward the plateau 19, which adjoins the rounded portion 20 in the direction of the trailing edge 9. The projection 5 has the steep flank 17 on the pressure side of the blade 3, and the steep flank 18 on the suction side.

The elevation 12 is arranged in the first portion 8. The elevation 12 is designed as an energy director with a triangular cross section, and extends as a prism-shaped body over the entire second portion 8.

Figure 3:
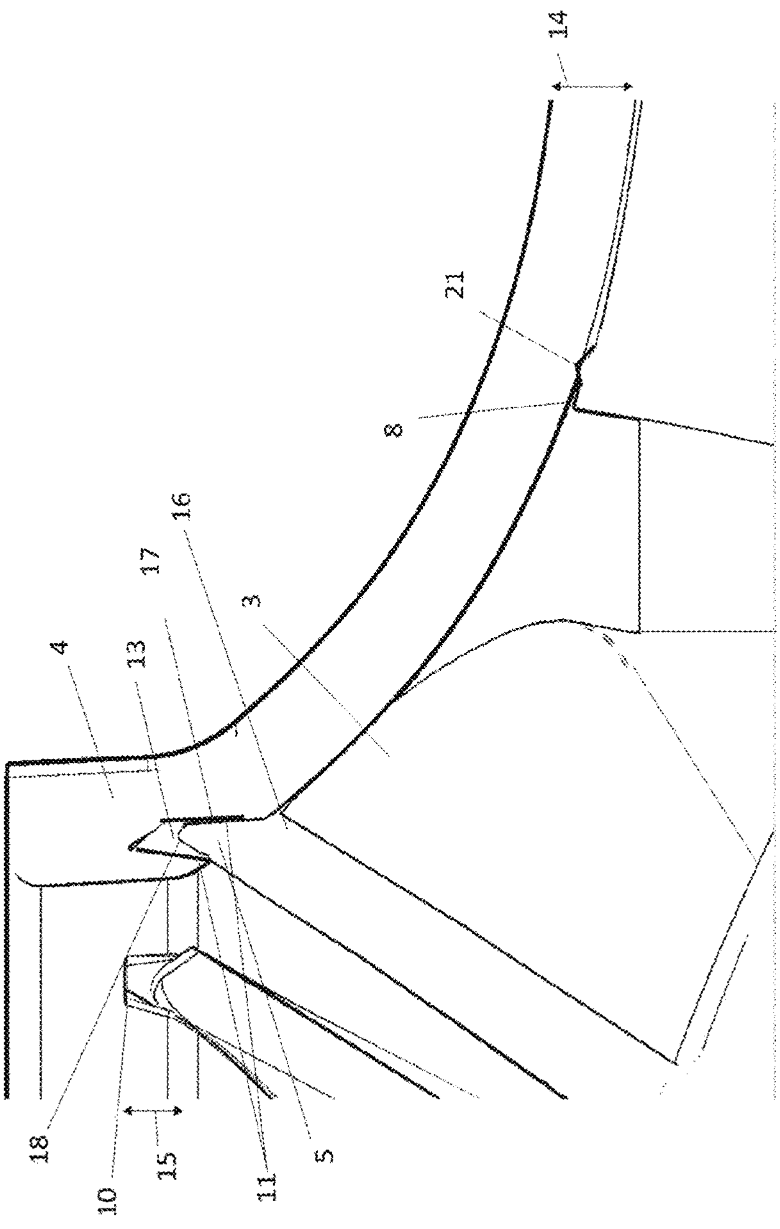
FIG. 3 shows a detail illustration of the projection of the blade in the groove of the cover plate.

FIG. 3 shows a detail illustration of the projection 5 of the blade 3 in the groove 10 of the cover plate 4. The groove 10 has a groove height 15, which corresponds in this exemplary embodiment to 30% of the cover plate height 14. Close to the blade back 16, the width of the projection 5 is greater than the width of the groove 10. Owing to this advantageous overdimensioning of the wedge-shaped projection 5, a linear contact location 11 is formed both on the suction side flank 18 and on the pressure side flank 17. In the direction of a sonotrode to be attached, the linear contact locations 11 are at an advantageous angle for the introduction of energy, thereby making it possible to form two reliable, materially integral, linear joints. Arranged above the projection 5 and within the groove 10 is a cavity 13, which is based on the overdimensioning of the wedge-shaped projection 5.

With the aid of the prism-shaped energy director, a materially integral, linear joint 21 is formed in the second portion 8 of the blade 3.

Figure 4:
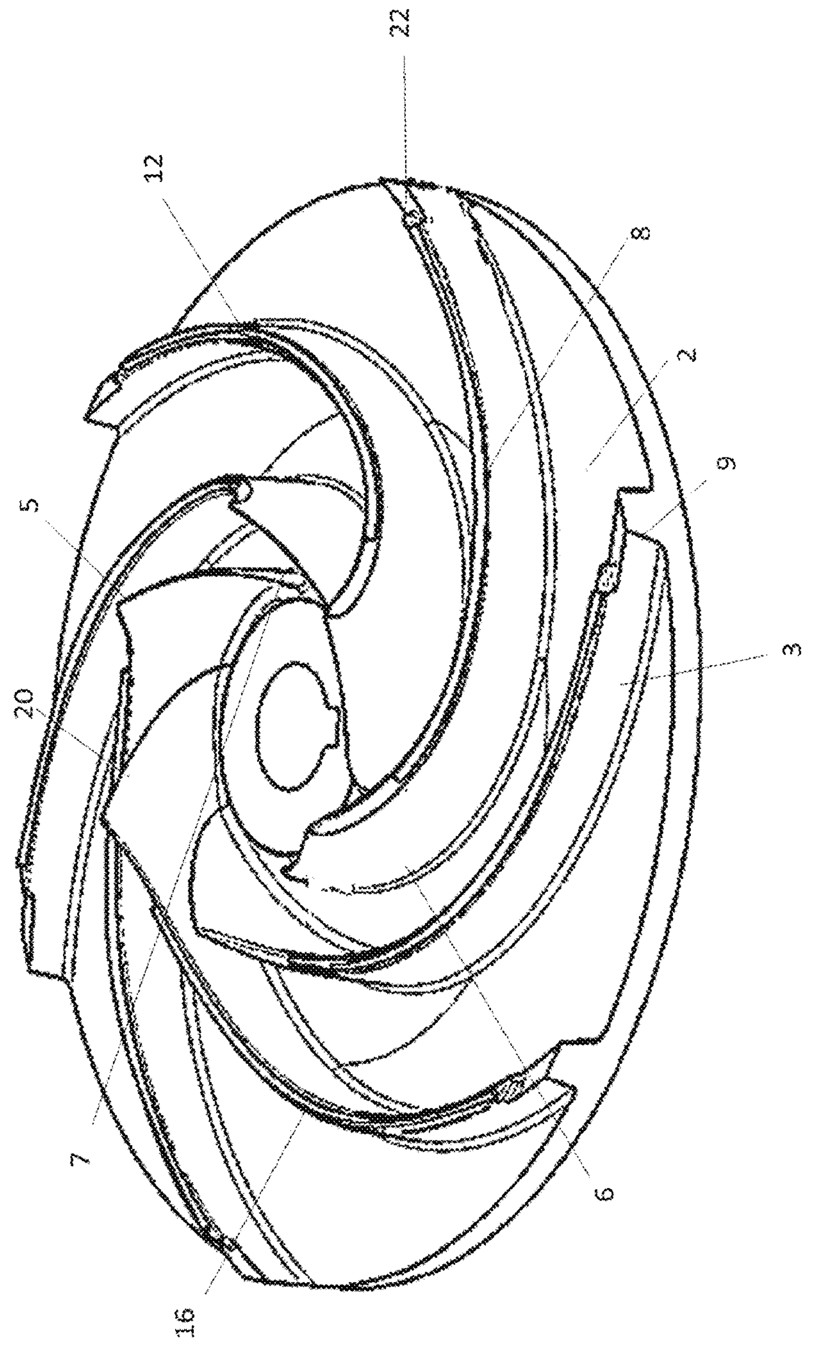
FIG. 4 shows a perspective illustration of another rear shroud with blades.

FIG. 4 shows a perspective illustration of another variant of the rear shroud 2 with six blades 3. Each blade 3 extends with a radially outward curvature from the leading edge 7 for the fluid to the trailing edge 9. The trailing edge 9 is joined seamlessly to the edge of the rear shroud 2.

On its blade back 16, the blade 3 comprises three portions 6, 8 and 22. The first portion 6 extends from the leading edge 7 in the direction of the trailing edge 9 and occupies 14% of the blade length. The second portion 8 directly adjoins the first portion 6 and extends over 78% of the blade length. The third portion 22 directly adjoins the second portion 8, and it makes up 8% of the blade length.

The projection 5 is arranged in the first portion 6 and extends over the entire surface of the first portion 6 on the blade back 16. The projection 5 has an elongate rounded portion 20 directly adjoining the leading edge 7 and is in the form of a broad wedge. This results in positive engagement at the linear contact locations in the first portion 6 when it is welded to the cover plate 4.

The elevation 12 is designed as an energy director with a triangular cross section, and extends as a prism-shaped body over the entire second portion 8, thereby ensuring that, by way of the energy director, the joint between the blade 3 and the cover plate 4 is formed in a particularly stable manner during welding. The third portion 22 is formed without the projection 5 and without the elevation 12. As a result, welding to the cover plate 4 does not involve the formation of a positive and material joint between the blade 3 and the cover plate 4 in the third portion 22 in order to avoid weakening the cover plate 4 at the outer edge by the introduction of grooves 10.

The foregoing disclosure has been set forth merely to illustrate the disclosure and is not intended to be limiting. Since modifications of the disclosed embodiments incorporating the spirit and substance of the disclosure may occur to persons skilled in the art, the disclosure should be construed to include everything within the scope of the appended claims and equivalents thereof.

The invention claimed is:

1. A centrifugal pump comprising:

an impeller, which has a rear shroud on which blades are arranged, wherein the blades are at least partially in contact with a cover plate, wherein each of the blades has a projection configured to form a joint with the cover plate, wherein the projection defines a wedge shape and, upon engagement into a groove, the projection forms two linear contact locations at which the wedge shape contacts the cover plate, in order to produce a materially integral joint with the cover plate, wherein the projection extends axially from only one longitudinal end of each of the blades.

2. The centrifugal pump as claimed in claim 1, wherein the cover plate has the groove in which the projection engages.

3. The centrifugal pump as claimed in claim 1, wherein each of the blades has a first portion, which extends downstream from a leading edge, and the first portion is adjoined directly by a second portion, wherein the projection is formed in at least one of the portions.

4. The centrifugal pump as claimed in claim 3, wherein the second portion is adjoined directly by a third portion, which extends as far as a trailing edge.

5. The centrifugal pump as claimed in claim 3, further comprising: an elevation configured to direct energy and that is formed in at least the second portion of each of the blades, wherein the elevation is prism-shaped.

6. The centrifugal pump as claimed in claim 3, wherein the first portion extends on a back of each of the blades over more than 10% of the blade length.

7. The centrifugal pump as claimed in claim 3, wherein the projection extends completely over the first portion.

8. The centrifugal pump as claimed in claim 3, wherein the elevation extends completely over the second portion.

9. The centrifugal pump as claimed in claim 1, further comprising: a cavity that is formed between the projection and the groove.

10. The centrifugal pump as claimed in claim 1, wherein the groove has a height of at least 10% of the blade height.

11. The centrifugal pump as claimed in claim 1, wherein the cover plate is ultrasonically welded to each of the blades.

12. The centrifugal pump as claimed in claim 1, wherein the cover plate and the rear shroud with each of the blades are formed from a plastic, including a polysulfone or a polyphenylsulfide or a polyethersulfone.

13. A method for producing an impeller of a centrifugal pump, comprising:
- injection molding a rear shroud with blades;
- injection molding a cover plate with grooves and/or milling grooves into the cover plate;
- ultrasonic welding the cover plate to the blades of the rear shroud; wherein
  - two linear, materially integral contact locations with the cover plate are formed at a projection on engagement in the groove, and
  - the projection defines a wedge shape and, upon engagement into the groove, the projection forms the two linear materially integral contact locations at which the wedge shape contacts the cover plate, in order to produce a materially integral joint with the cover plate.

14. The method as claimed in claim 13, wherein the projection extends axially from only one longitudinal end of each of the blades.

* * * * *